(12) United States Patent
Golding et al.

(10) Patent No.: US 7,715,531 B1
(45) Date of Patent: May 11, 2010

(54) CHARTING AUDIBLE CHOICES

(75) Inventors: Andrew R. Golding, Mountain View, CA (US); Egon Pasztor, Mountain View, CA (US)

(73) Assignee: Google Inc., Mountain View, CA (US)

( * ) Notice: Subject to any disclaimer, the term of this patent is extended or adjusted under 35 U.S.C. 154(b) by 893 days.

(21) Appl. No.: 11/173,804

(22) Filed: Jun. 30, 2005

(51) Int. Cl.
*H04M 11/06* (2006.01)

(52) U.S. Cl. .............. 379/88.18; 370/401; 379/88.23; 379/211.02; 379/266.07; 700/83; 704/201; 704/270.1; 709/217; 715/705; 715/733

(58) Field of Classification Search .......... 379/88.01, 379/210.01, 211.02, 67.1, 88.18, 88.22, 214.01, 379/266.07, 88.23; 704/270.01, 275, 201, 704/270.1; 358/1.15; 370/401; 700/83; 709/217; 715/705, 733
See application file for complete search history.

(56) References Cited

U.S. PATENT DOCUMENTS

| 4,674,116 | A | * | 6/1987 | Curtin et al. ........... 379/214.01 |
| 5,524,137 | A | * | 6/1996 | Rhee ....................... 379/88.01 |
| 5,799,077 | A | * | 8/1998 | Yoshii ................... 379/266.07 |
| 6,249,809 | B1 | * | 6/2001 | Bro ............................ 709/217 |
| 6,285,362 | B1 | * | 9/2001 | Kikuchi et al. .............. 715/733 |
| 6,542,584 | B1 | * | 4/2003 | Sherwood et al. ......... 379/88.18 |
| 6,633,397 | B2 | * | 10/2003 | Amano et al. .............. 358/1.15 |
| 6,909,780 | B1 | * | 6/2005 | Hu et al. ................. 379/211.02 |
| 7,065,188 | B1 | * | 6/2006 | Mei et al. ................. 379/88.23 |
| 7,123,699 | B2 | * | 10/2006 | Suder et al. .............. 379/88.18 |
| 7,145,998 | B1 | * | 12/2006 | Holder et al. .......... 379/210.01 |
| 7,167,832 | B2 | * | 1/2007 | Abella et al. ................. 704/275 |
| 7,260,537 | B2 | * | 8/2007 | Creamer et al. .......... 704/270.1 |
| 2003/0074091 | A1 | * | 4/2003 | Kim ........................... 700/83 |
| 2003/0171926 | A1 | * | 9/2003 | Suresh et al. ............ 704/270.1 |
| 2004/0193403 | A1 | * | 9/2004 | Creamer et al. ............. 704/201 |
| 2005/0081152 | A1 | * | 4/2005 | Commarford et al. ....... 715/705 |
| 2005/0100145 | A1 | * | 5/2005 | Spencer et al. ........... 379/88.22 |
| 2005/0123118 | A1 | * | 6/2005 | Terry et al. ............. 379/211.02 |
| 2006/0165104 | A1 | * | 7/2006 | Kaye .......................... 370/401 |

OTHER PUBLICATIONS

Scansoft, Call Navigator, Reduce Costs & Maximize Customer Satisfaction through Natural Language, 2005, http://www.scansoft.com/speechworks/callnavigator/.

* cited by examiner

*Primary Examiner*—Gerald Gauthier
(74) *Attorney, Agent, or Firm*—Fish & Richardson P.C.

(57) ABSTRACT

In one embodiment, a system and method for charting audible choices comprises determining if an option is offered; selecting the option if the option is offered; and saving a result, wherein the result is associated with the selected option.

15 Claims, 8 Drawing Sheets

CHARTING AUDIBLE CHOICES

BACKGROUND OF THE INVENTION

Interactive voice response systems, often referred to as voicemail systems, are a common way of channeling incoming calls. Many voicemail systems can be inefficient and annoying for the caller who may need to listen to multiple levels of options before reaching his final destination. It would be beneficial to have a more efficient way of navigating through a voicemail system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
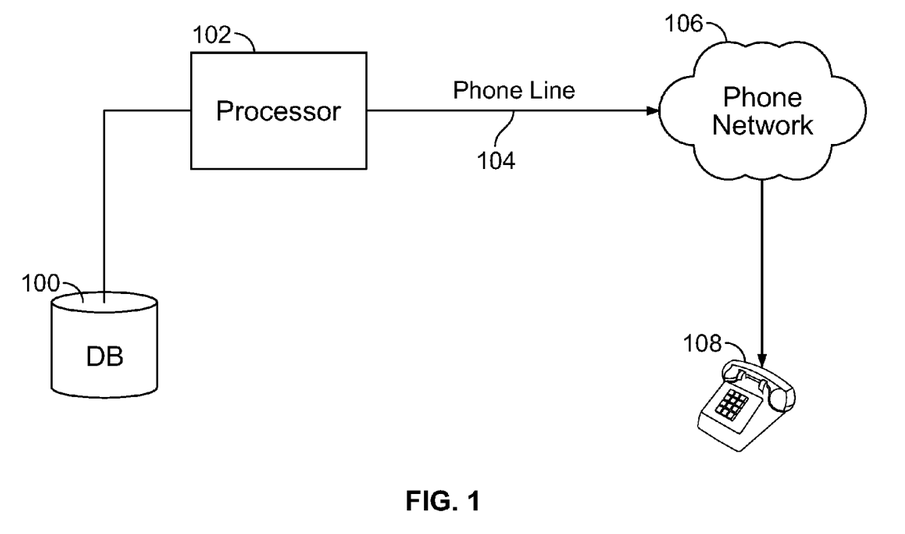
FIG. 1 is an example of a system for charting audible choices according to one embodiment.

FIG. 1 is an example of a system for charting audible choices, such as those offered through a voicemail system, according to one embodiment. In this example, the processor 102 is shown to be coupled with a database 100. The database 100 may provide the processor 102 with phone numbers, such as business phone numbers, to processor 102. Processor 102 may use the information from database 100 to call a recipient phone system 108. The processor 102 may call through a phone line 104. Examples of phone line 104 include a traditional telephone line, a cable modem line, or any internet or network connection. Phone line 104 may also be a representation of a wireless connection to the phone network 106.

Figure 2:
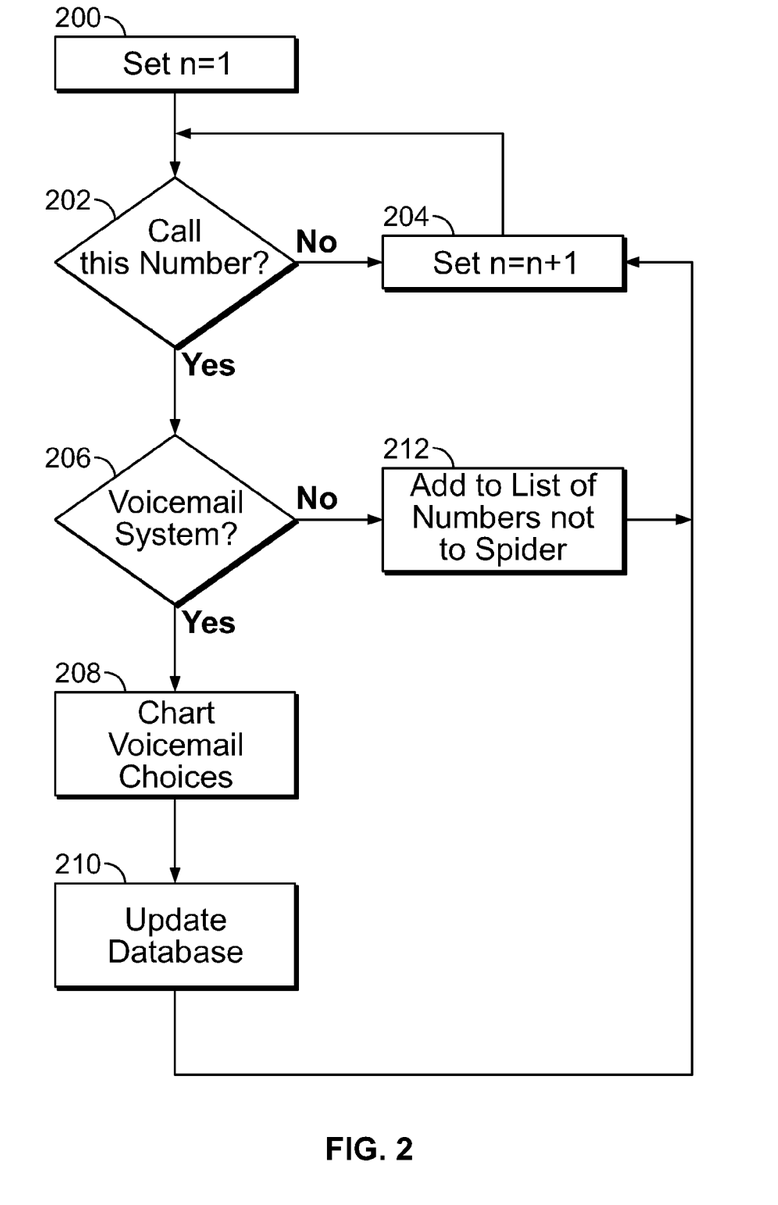
FIG. 2 is a flow diagram of a method for charting audible options, such as those offered through a voicemail system, according to one embodiment.

FIG. 2 is a flow diagram of a method for charting audible options, such as those offered through a voicemail system, according to one embodiment. In this example, N is set to equal 1 (200). It is determined whether this particular phone number (N) should be called (202). An example of whether this number should be called is if this number is not already on a "do not call" list. An example of when a phone number might be called is if the same phone number appears multiple times under different names, such as various doctors listed under the same phone number. This type of situation might indicate a voicemail system where voicemail navigation might be beneficial.

If it is determined not to call this number (202), then N is set to equal to N+1 (204), and it is determined whether the next number should be called (202).

If this phone number is called, then it is determined whether it is answered by a voicemail system (206). If it is not answered by a voicemail system, then this phone number is added to a list of numbers not to spider (212). For example, if the phone call was answered by a person or an answering machine then that phone number may be added to a list of phone numbers not to chart. Alternatively, the phone number may be deleted from a list of phone numbers to call.

If a voicemail system is reached (206), then the voicemail choices offered by the voicemail system is charted (208). Further details of charting the voicemail choices are later discussed in conjunction with the remaining figures. The database of phone numbers is updated with the charted information (210). For example, information such as confirmation of the existence of the business may be associated with the phone number, or a graphical representation of the voicemail choices may be associated with the business that owns the phone number.

FIGS. 3A-3D are flow diagrams of a method for charting audible options according to one embodiment. In this example, a phone number is selected (300). Examples of selecting a phone number include selecting a number from a public list of business phone numbers, a database of phone numbers to be called, or phone numbers retrieved from business listings on the interne.

Figure 3A:
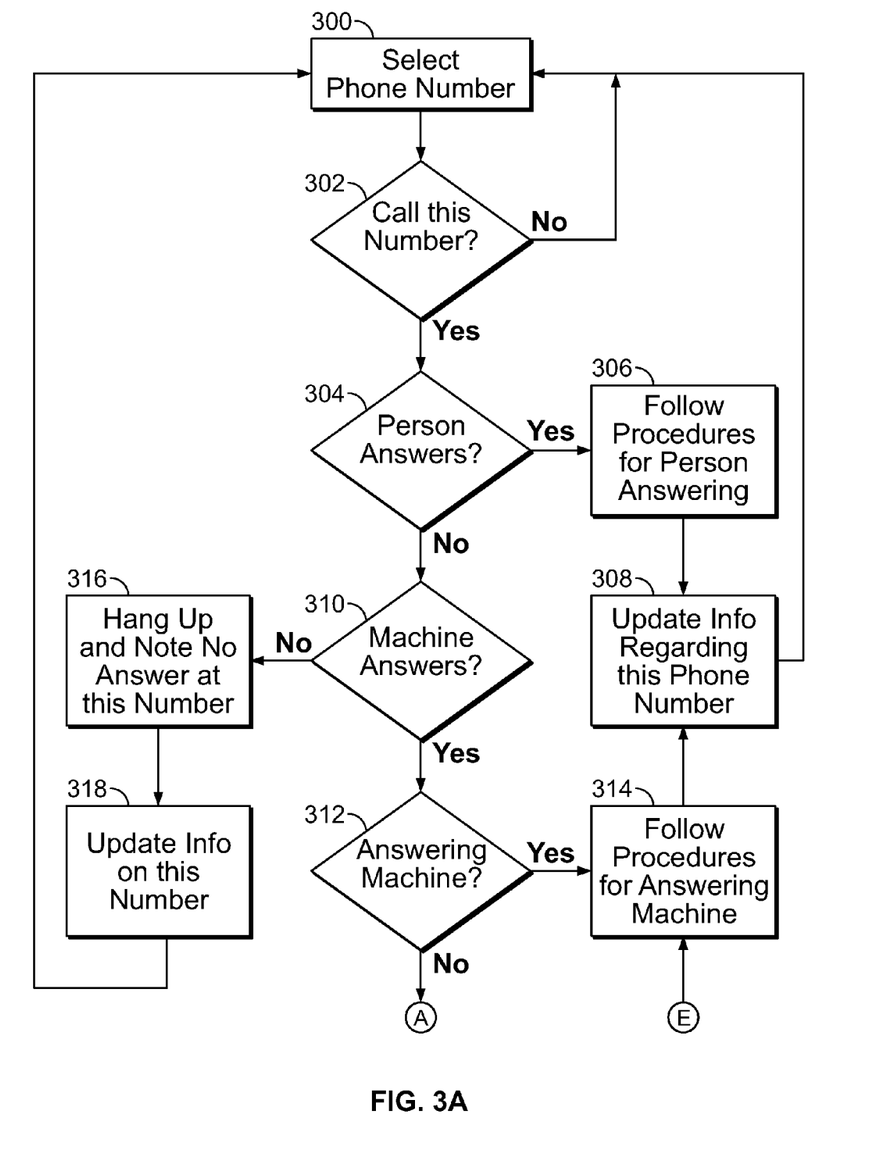
FIGS. 3A-3D are flow diagrams of a method for charting audible options according to one embodiment.

It is then determined whether to call this number (302). If it is determined not to call this number, a new phone number is selected (300). An example of why a phone number would not be called is if that phone number is listed on a "do not call" list. An example of how phone numbers are added to such a list is that the owner of a phone number may have voluntarily put the number on this list. Another example is that phone numbers may be added to this list if it is determined that these numbers are currently inappropriate for automatic voicemail exploration.

Once a phone number is called (302), then it is determined whether a person answers the call (304). If a person answers the call, then procedures for a person answering the call can be followed (306). For example, if a person answers the call, the call may be terminated. In another example, a conversation may ensue, such as automatically asking the person to verify that this number is for the name of the business listed for this number. Thereafter, information regarding this phone number is updated (308). For example, it may be noted that the business listed for this number has been confirmed to still be true. Another piece of information to be updated may be that there is no voicemail system for this business and that this phone number should be added to the "do not call" list. Thereafter, a new phone number is selected (300).

If a person does not answer the call (304), then it is determined whether a machine answers the call (310). An example of how a determination of whether a person answers a call, or an answering machine answers the call or a voicemail system answers the call may be performed by modeling a natural human answering a phone versus a machine voice answering the phone versus an answering machine message. For example, a Hidden Markov Model (HMM) may be used to build such models. Hidden Markov Models are well understood by persons in the art. For example, a person answering the phone may be distinguished from a voicemail system by noted factors such a rise in the inflection, or mumbling, or recognizing certain phrases, such as "Hello?" versus "Hello, you have reached . . . ".

If a person does not answer the call, and a machine also does not answer the call (310), then the call is terminated and it is noted that there is no answer at this number (316). This information is updated and associated with this phone number (318), and a new phone number is selected for analysis (300).

If a machine answers the call (310), then it is determined whether it is answered by an answering machine (312). An answering machine as used herein includes any automatic phone answering system that does not offer a selection of choices. Examples of answering machines include a personal answering machine or an automatic message. Examples of an automatic message include a phone forwarding message, a message stating that the number has changed and providing a new number, or a message stating that this number no longer exists.

If the call is answered by an answering machine (312), then procedures for the call being answered by an answering machine are followed (314). An example of such a procedure is recording the message spoken on the answering machine for further analysis. For example, a human may listen to the recorded message to determine further action regarding this phone number. In another example, certain phrases or words may be recognized such as "forwarding", "new number", or "no longer exists", or "your call cannot get through". Appropriate information, such as "forwarded", "new number", "no longer exists", may be updated regarding this phone number (308). Thereafter, a new phone number is selected for analysis (300).

Figure 3B:
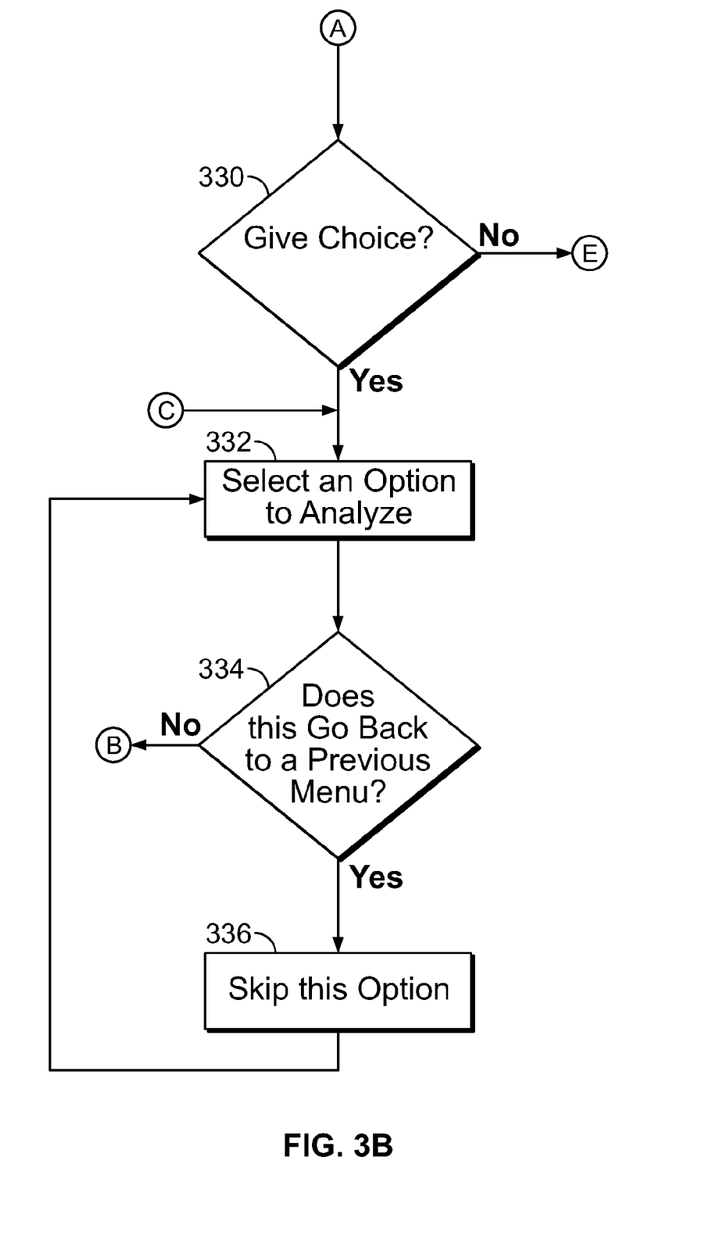

If a machine answers the call (310), but it is not an answering machine (312), then it is determined whether a choice is given by the recorded response (330). For example, a voicemail system may start with a choice of pressing 1 to continue in English. If no choice is given (330), then procedures for an answering machine are followed (314). If, however, at least one choice is given, then one of the options is selected for analysis (332). For example, the number 1 option may be analyzed.

It is then determined whether this option goes back to a previous menu (334). In one example, this determination can be made by actually selecting the option and recognizing that the recording has returned to a previous menu. In another example, the analysis may occur prior to actually choosing the option and recognizing certain words such as "to go back" or "previous menu". If this option does go back to a previous menu (334), then this option is skipped (336), and a new option is selected for analysis (332).

In one embodiment, information is updated with regard to the phone number at every level within the voicemail system. For example, whenever at least one choice is offered, the choice is saved, for example, by recording the choice. This recorded choice may be literally recorded so that the choice can be heard by a human, or in another example, the choice can be saved in a database with information associated with the offered choice. For example, if the choice that it is given is "for English, press 1" then the phrase "for English" and "press 1" may be recognized and the information saved on the database may be "English=1". If the choice is audibly recorded, then it may be transcribed into text for further use, by for example, manual transcription or automatic speech recognition. In one example, automatic speech recognition programs such as IBM's Via Voice or Dragon maybe used in conjunction with HMMs for improving performance by training for improved performance. One example includes training on phrases that might be expected to be heard in voicemail systems such as "for faster service, please have your account number ready", "press <digit> to return to the main menu", etc. Another example is by training on the websites and/or (successfully recognized) voice menus of other businesses in the same category of the Yellow Pages as the business that is being called. Another example is by exploiting the "parallel speech corpora" that may be found in a menu that includes multiple language options such as English and Spanish. The two language subtrees may be expected to give the same options and limited machine translation may be used to help verify the correctness in understanding and/or fill in the gaps. In one embodiment, automatic speech recognition programs may be used along with manual corrections for some of these examples.

If this option does not go back to a previous menu (334), then it is determined whether this option has already been selected (340).

If this option has already been selected (340), then it is determined whether exploration of this option is complete (342). For example, this option may have been selected in a previous rendition and there may be another layer of choices offered in the voicemail system. If a second layer of choices associated with this option has not been fully explored, then the exploration of this option is not yet complete. If, however, every choice offered under this option has been explored, then the exploration of this option is complete.

If the exploration of this option is not yet complete (342), then this option is selected (352). If the exploration of this option is complete (342) then it is determined whether all options at this level have been explored (346). For example, if a voicemail system has two levels of choices such as the first level of choices being press 1 for English and 2 for Spanish, and then within the English menu having another level of choices such as press 1 for billing questions and 2 for new services, then all options at the first level has been explored if both the English menu and the Spanish have been explored. If all options at this level have been explored (346), then the call is terminated (348). If, however, all options at this level have not yet been explored (346), then a new option is selected to be analyzed (332 of FIG. 3B).

If this option has not already been selected (340), then it is determined whether this option will send the call to a person (350). One example of determining whether selecting this option will send a call to a person is to determine if the message associated with this option includes certain phrases. For example, if the option states "for X, press 1" and X is recognized as a name, then selecting the option may send the call to a person. One way of recognizing whether X is a person it to refer to a database of names such that names like Susan and John maybe recognized. Another way of recognizing whether X is a name is to correlate X with names that maybe listed on a website associated with this business. For example, if the phone number is for a medical center, the doctors are often listed on the medical center's website. If X matches a name listed on the website, then it can be determined that selecting this option will send the call to that person. Yet another example of recognizing whether X is a person is to detect common titles, such as "Dr." or "Ms." at the beginning of the name, or common morphemes in the surname, such as an initial "Mc" or "van", or a final "son" or "owitz", or common surnames overall, such as "Johnson", "Smith", or "Brown". Additionally, there may be various signals that may indicate that a human is about to answer the call once an option has been selected. Examples include Muzak or a similarly recognizable audible entertainment for those on hold, or a message such as "Your call will be answered in the order in which it was received", or "Your call will be monitored for your protection".

If selecting the option sends a call to a person (350), then a new option is selected to be analyzed (332 of FIG. 3B). If, however, selecting this option does not send the call to a person (350), then this option is chosen (352 of FIG. 3C). It is then determined whether choices are given within this option (350). If at least one choice is given, then one of the choices are selected for analysis (332 of FIG. 3B). If, however, there are no choices given (350), then it is determined whether a person answered the call (352). If a person answered the call, then procedures for a person answering the call are followed (358), and information regarding this node is updated (360).

The procedures for a person answering a call within a voicemail system maybe the same or different from the procedures from a person answering a call outside of a voicemail system. For example, if a new number is called and a person answers that call, the procedure maybe to ask the person to confirm the name of the business, whereas if a voicemail system answers the call and after choosing at least one option a person answers the call, the procedure maybe to terminate the call.

Figure 3C:
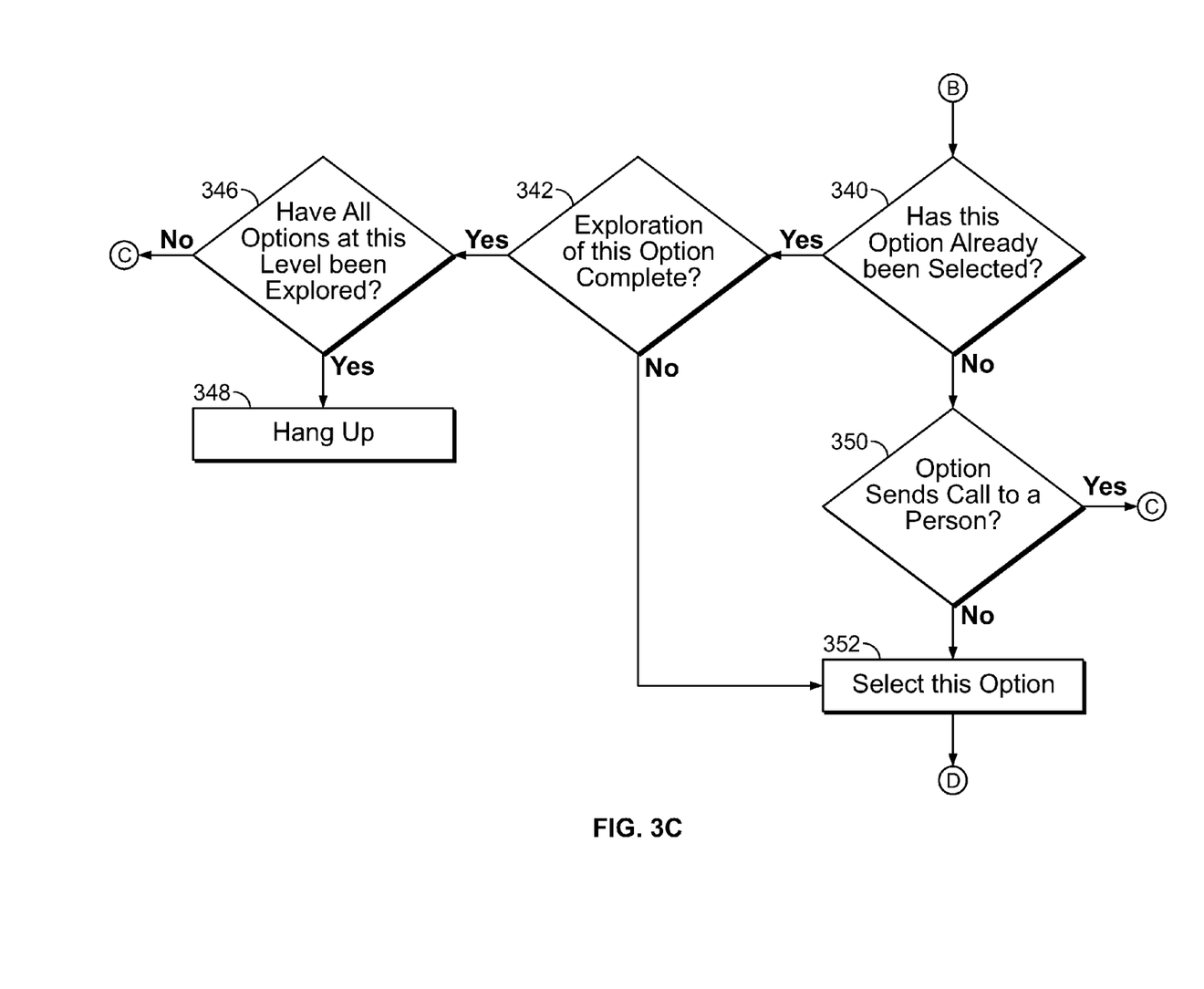
Figure 3D:
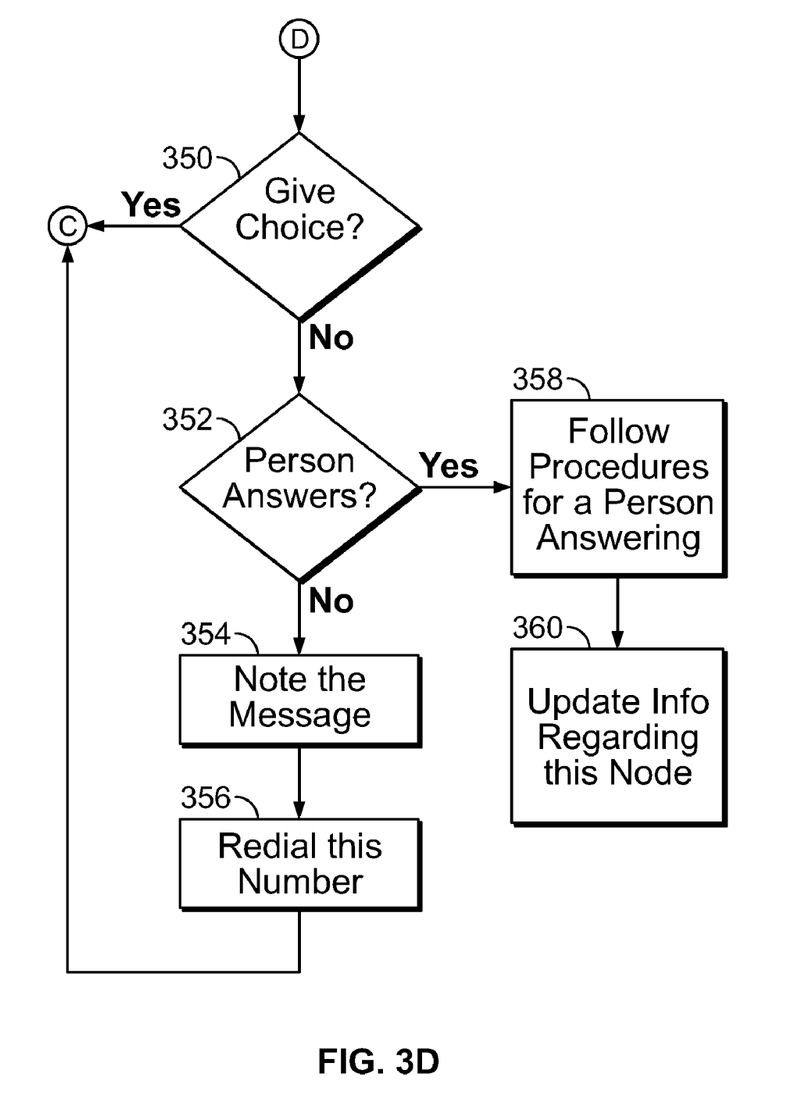

If a person does not answer the call (352), then the message is recorded (354). This phone number is redialed (356) and a option is selected for analysis (332).

Figure 4:
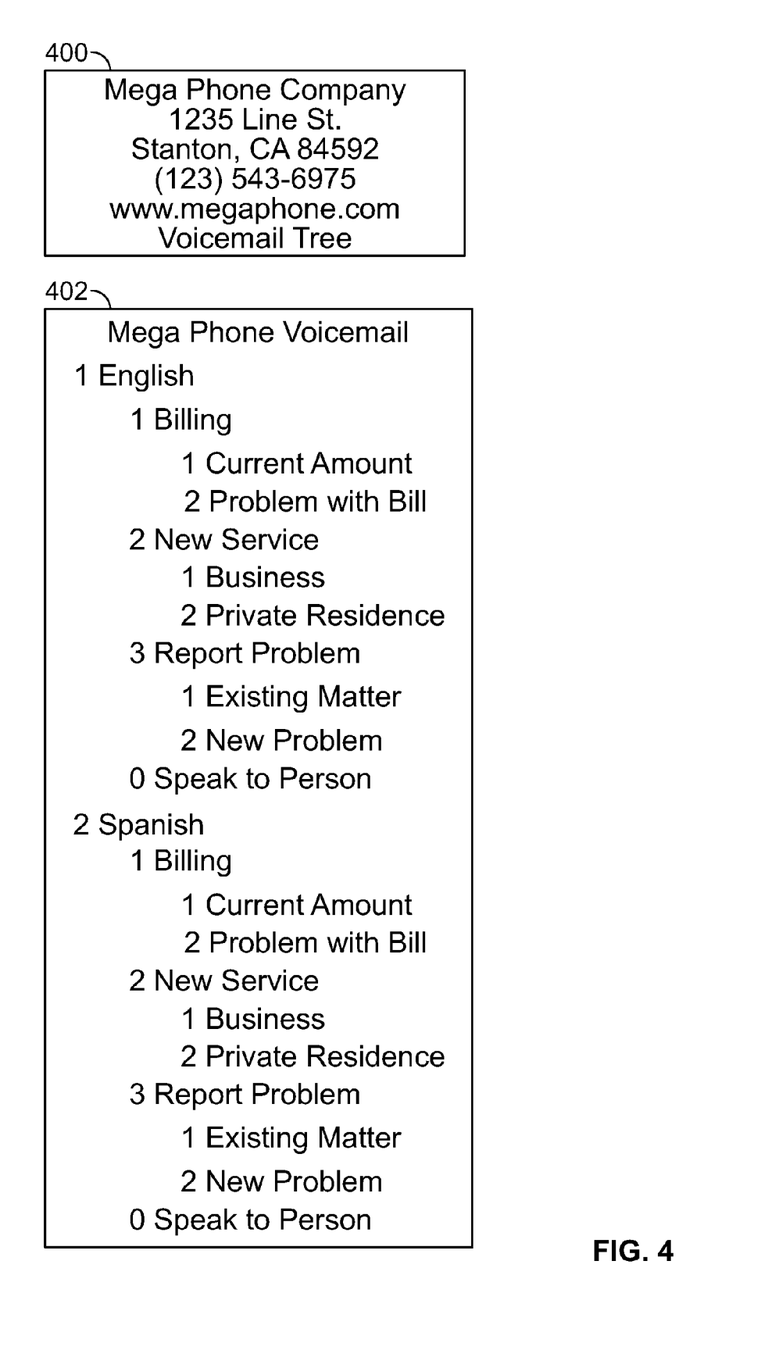
FIG. 4 shows an example of a business listing with voicemail information according to one embodiment.

FIG. 4 shows an example of a business listing with voicemail information according to one embodiment. In the example shown in FIG. 4, a business listing, such as Mega Phone Company might list its address, phone number, web site, and voicemail information. The voicemail information may be shown in various ways. One way to show the voicemail information is to have show it along with the address, phone number and website information. Another example of showing the voicemail information is to display it when a user selects voicemail information, such as "voicemail tree", and have the link go to the voicemail tree. Voicemail tree 402 is an example of visually displaying voicemail information. In this example, the mega phone voicemail tree shows a first level of options as being press 1 for English and 2 for Spanish. The next level of options for English include pressing 1 for billing, 2 for new services, 3 for reporting problems, and 0 to speak to a person. Within the billing option, the voicemail tree is shown to offer more options: press 1 to receive the current amount, and 2 if there is a problem with your bill. Similarly, in the new services option, pressing 1 will route the user to a department for business customers and pressing 2 will route the user to a department for private residents users. If the user pressed 3 to report a problem, he can press 1 if its an existing matter or 2 if its a new problem. The Spanish portion of the voicemail is similar to the English portion of the voicemail tree. Accordingly, in this embodiment, if a user looks up Mega Phone Company he can access various pieces of information about the business including a voicemail tree. If the user wants to report a problem with his phone line he may call the phone number of the Mega Phone Company and press a sequence of number such as 1 3 2 to report a new problem with his phone line.

Figure 5:
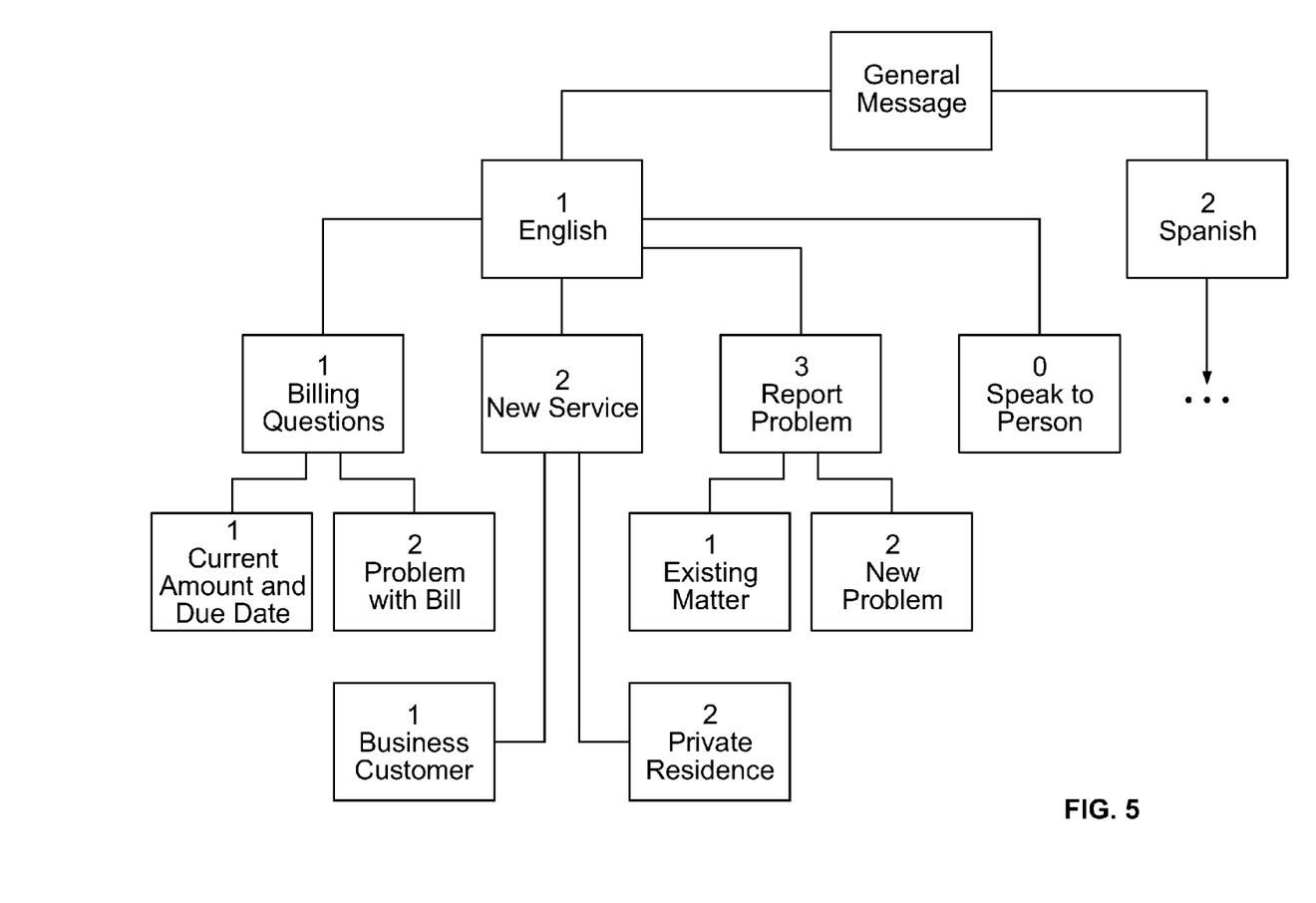
FIG. 5 shows another example of a visual representation of a voicemail system according to one embodiment.

FIG. 5 shows another example of a visual representation of a voicemail system. In this example, various options are shown to be represented in a tree form. The call is answered by a general message giving the options press 1 for English or 2 for Spanish. Within the English option, the user can press 1 for billing questions, 2 for new service, 3 to report a problem, or 0 to speak to a person. Within the billing questions option, the user can press 1 for the current amount and due date or 2 if there is a problem with the bill. Within the new service option, the user can press 1 for business customer or 2 for a private residence. Within the report a problem option, the user can press 1 for an existing matter or 2 for a new problem.

The examples of FIGS. 4 and 5 are in the particular manner shown for clarity, but there may be numerous ways of visually displaying audible options, such as voicemail options. For example, the audible options may be displayed using a dynamic graphical display which may expand the next level of the voicemail tree when the user hovers over a voicemail tree node with a mouse. An example of a type of code that can be used for such an implementation is JavaScript.

In one embodiment, a particular voicemail option, or a sequence of digits to choose that option, may be displayed rather than the entire voicemail tree. For example, a user may search for the terms "Mega Phone, speak to person", in which case a sequence of numbers such as (123) 543-6975-1-0 may be displayed which includes Mega Phone's phone number as well as sequential selections of options 1 and 0. As shown in the example of FIG. 4, pressing this sequence of numbers will reach a person speaking English at Mega Phone. In one embodiment, the sequence of numbers may be automatically dialed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for charting a menu structure for a plurality of entries in an interactive voice response system, comprising:
   identifying a telephone number in a collection of telephone numbers and automatically dialing the telephone number under control of a computer system;
   determining whether an interactive voice response system has answered a call resulting from dialing the telephone number;
   automatically navigating a menu structure for the voice response system and storing information indicative of the menu structure with the computer system; and
   automatically electronically charting the menu structure for review by one or more users.

2. The method of claim 1, wherein determining whether an interactive voice response system has answered comprises determining whether an entity that answered the call offers a numeric choice to a caller.

3. The method of claim 1, wherein automatically navigating the menu structure comprises automatically making selections corresponding to a telephone keypad in response to prompts from the interactive response system.

4. The method of claim 1, wherein electronically charting the menu structure comprises storing one or more audible recordings corresponding to each node in the menu structure, and presenting the audible recordings to a user for charting of the menu structure.

5. The method of claim 1, further comprising providing, for display to a user, a graphical presentation of the menu structure.

6. The method of claim 5, wherein the graphical representation of the menu structure is provided in the form of an indented list of textual labels showing a hierarchy of menu choices.

7. The method of claim 1, further comprising providing, for display to a user, a sequence of digits corresponding to a destination in the menu structure.

8. The method of claim 1, wherein the interactive voice response system comprises a voice mail system.

9. The method of claim 1, further comprising automatically declining to call the telephone number if the telephone number is on a do not call list.

10. A tangible computer readable medium comprising one or more computer programs defining instructions for:
   identifying a telephone number in a collection of telephone numbers and automatically dialing the telephone number under control of a computer system;
   determining whether an interactive voice response system has answered a call resulting from dialing the telephone number;
   automatically navigating a menu structure for the voice response system and storing information indicative of the menu structure with the computer system; and
   automatically electronically charting the menu structure for review by one or more users.

11. The product of claim 9, wherein automatically navigating the menu structure comprises automatically making selections corresponding to a telephone keypad in response to prompts from the interactive response system.

12. The product of claim 1, further comprising instructions for providing, for display to a user, a graphical presentation of the menu structure.

13. A system for analyzing interactive voice responses choices, comprising:
   a processor configured to:
      identifying a telephone number in a collection of telephone numbers and automatically dialing the telephone number under control of a computer system;
      determining whether an interactive voice response system has answered a call resulting from dialing the telephone number;
      automatically navigating a menu structure for the voice response system and storing information indicative of the menu structure with the computer system;
      automatically electronically charting the menu structure for review by one or more users; and
   a memory coupled with the processor, wherein the memory provides the processor with instructions.

14. The system of claim 13, wherein automatically navigating the menu structure comprises automatically making selections corresponding to a telephone keypad in response to prompts from the interactive response system.

15. The system of claim 13, wherein the processor is further configured to provide, for display to a user, a graphical presentation of the menu structure.

* * * * *